(12) United States Patent
Kanemoto et al.

(10) Patent No.: US 6,928,296 B2
(45) Date of Patent: Aug. 9, 2005

(54) BASE STATION APPARATUS AND RADIO COMMUNICATION METHOD

(75) Inventors: Hideki Kanemoto, Yokosuka (JP); Kazuyuki Miya, Kawasaki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 487 days.

(21) Appl. No.: 10/069,572
(22) PCT Filed: Jun. 27, 2001
(86) PCT No.: PCT/JP01/05568
§ 371 (c)(1), (2), (4) Date: Feb. 27, 2002
(87) PCT Pub. No.: WO02/01752
PCT Pub. Date: Jan. 3, 2002

(65) Prior Publication Data
US 2002/0115466 A1 Aug. 22, 2002

(30) Foreign Application Priority Data
Jun. 29, 2000 (JP) .................. 2000-197132

(51) Int. Cl.[7] .............................. H04Q 7/20
(52) U.S. Cl. ............ 455/522; 455/69; 455/456; 455/562; 370/335; 370/342
(58) Field of Search ............. 455/522, 562, 455/456, 69; 370/335

(56) References Cited

U.S. PATENT DOCUMENTS 6,101,399 A * 8/2000 Raleigh et al. ........... 455/561
6,252,867 B1 * 6/2001 Pfeil et al. ............... 370/335

FOREIGN PATENT DOCUMENTS

| EP | 932218 A2 | 7/1999 |
|---|---|---|
| JP | 11074831 | 3/1999 |
| JP | 11215049 | 8/1999 |
| JP | 2000 059278 | 2/2000 |
| JP | 2001 339758 | 12/2001 |
| WO | 9833349 | 7/1998 |

OTHER PUBLICATIONS

1XTREME; Motorola and Nokia, 3GPP2 TSG-S Meeting, pp. 1–25.
International Search Report dated Oct. 2, 2001.
Korean Office Action dated Aug. 30, 2004 with English translation.

* cited by examiner

Primary Examiner—Nick Corsaro
Assistant Examiner—Alan T. Gantt
(74) Attorney, Agent, or Firm—Stevens, Davis, Miller & Mosher, LLP

(57) ABSTRACT

A direction of arrival estimation section 106 estimates the direction of arrival of a signal, and a DSCH-using terminal determination section 108 determines a communication terminal that is to use a DSCH based on communication terminals from which a request signal is received and signal direction of arrival. That is to say, the DSCH-using terminal determination section 108 determines communication terminals that are to use the DSCH in the order of communication terminals whose signal directions of arrival are most contiguous from among communication terminals wishing to use the DSCH.

16 Claims, 15 Drawing Sheets

FIG. 7A

| PRIORITY | COMMUNICATION TERMINAL NO. | ANGLE OF ARRIVAL |
|---|---|---|
| 1 | #4 | 80° |
| 2 | #2 | 40° |
| 3 | #1 | 10° |
| 4 | #3 | 60° |
| 5 | #5 | 100° |
| 6 | #6 | 120° |

FIG. 7B

| PRIORITY | COMMUNICATION TERMINAL NO. | ANGLE OF ARRIVAL | DIVISOR | EVALUATION NUMERIC VALUE |
|---|---|---|---|---|
| 1 | #4 | 80° | 6 | 13.3 |
| 2 | #2 | 40° | 5 | 8 |
| 3 | #1 | 10° | 4 | 2.5 |
| 4 | #3 | 60° | 3 | 20 |
| 5 | #5 | 100° | 2 | 50 |
| 6 | #6 | 120° | 1 | 120 |

…

BASE STATION APPARATUS AND RADIO COMMUNICATION METHOD

TECHNICAL FIELD

The present invention relates to a base station apparatus and radio communication method for use in high-speed data communication.

BACKGROUND ART

One multiple access method in a digital radio communication system is CDMA (Code Division Multiple Access). In a standard established by 3GPP (3rd Generation Partnership Project), a standards body related to mobile radio communication systems, this CDMA method is used and a Downlink Shared Channel (DSCH) used for high-speed data communication in a downlink (a channel from a base station to a communication terminal) is stipulated as one channel shared by a plurality of communication terminals (hereinafter referred to as "shared channel").

As this DSCH is used by being assigned to each communication terminal on a specified transmission unit basis (for example, on a frame-by-frame basis), its use is anticipated in downlink high-speed packet transmission, etc.

In a CDMA system, there are cases where an adaptive array (hereinafter abbreviated to "AAA") is used with the object of reducing interference. This adaptive array is a technology whereby a base station is equipped with an array antenna comprising a plurality of antenna elements, and directivity is formed by multiplying a transmit signal by a complex coefficient (hereinafter this complex coefficient is referred to as a "weight"), and performing transmission in line with that directivity.

However, since the above-described DSCH is assigned to communication terminals on a per-predetermined-transmission-unit basis, when an adaptive array is applied to DSCH signal transmission, and DSCH signal transmission is performed with a different directivity formed for each communication terminal, directivity is switched every DSCH signal transmission unit. Also, as the DSCH is a channel used for high-speed communication, the DSCH signal power is extremely high compared with a dedicated channel signal.

Thus, when the DSCH is assigned to a particular communication terminal, interference imposed on a dedicated channel signal from the DSCH signal suddenly increases in communication terminals located in the vicinity of a communication terminal to which the DSCH is assigned, and therefore, as shown in FIG. 1, the increase in dedicated channel signal transmission power due to transmission power control in a downlink (a channel from abase station to a communication terminal) (transmission power control that increases or decreases transmission power at a base station according to a transmission power increase/decrease command from a communication terminal) cannot keep up with the increase in interference power conveyed from the DSCH signal. There is thus a problem of the occurrence of major deterioration of dedicated channel signal reception quality (for example, the reception SIR) in communication terminals located in the vicinity of a communication terminal to which the DSCH is assigned, and obstruction of communication. Moreover, since interference power fluctuates abruptly, there is a problem of loss of CDMA system stability and a decrease in system capacity.

DISCLOSURE OF INVENTION

It is an object of the present invention to provide a base station apparatus and radio communication method that make it possible to prevent a major deterioration of dedicated channel signal reception quality even when an adaptive array is used for shared channel signal transmission.

The present inventors arrived at the present invention by noting that a cause of major deterioration of dedicated channel signal reception quality lies in the fact that, when an adaptive array is applied to shared channel signal transmission, the difference between the transmission power value of the dedicated channel signal and the transmission power value of the shared channel signal suddenly becomes large in a communication terminal located in the vicinity of a communication terminal to which the shared channel is assigned, and finding that it is possible to support normal transmission power control in a dedicated channel signal downlink by reducing this difference in transmission power values.

Thus, in order to achieve the above object, the present invention alleviates the effect of interference imposed on a dedicated channel signal by a shared channel signal by reducing the difference between the transmission power value of a shared channel signal for a communication terminal to which a shared channel is assigned and the transmission power value of a dedicated channel signal for a communication terminal located in the vicinity of that communication terminal to which the shared channel is assigned.

That is to say, the present invention reduces the difference between the transmission power value of a dedicated channel signal and the transmission power value of a shared channel signal by gradually increasing interference imposed on a communication terminal located in the vicinity of a communication terminal to which the shared channel is assigned prior to shared channel signal transmission.

Also, the present invention reduces the difference between the transmission power value of a dedicated channel signal and the transmission power value of a shared channel signal beforehand by increasing the transmission power value of a dedicated channel signal for a communication terminal located in the vicinity of a communication terminal to which the shared channel is assigned in correspondence to the amount of increase of the shared channel signal transmission power value.

Furthermore, the present invention provides sufficient time for reducing the difference between the dedicated channel signal transmission power value and shared channel signal transmission power value by means of normal transmission power control on a dedicated channel signal downlink by extending the time during which the amount of interference imposed by the shared channel signal on a communication terminal located in the vicinity of a communication terminal to which the shared channel is assigned is held constant.

BRIEF DESCRIPTION OF DRAWINGS

FIG. 7A is a table for explaining the DSCH assignment order method of a base station apparatus according to Embodiment 2 of the present invention;

FIG. 7B is a table for explaining the DSCH assignment order method of a base station apparatus according to Embodiment 2 of the present invention;

BEST MODE FOR CARRYING OUT THE INVENTION

With reference now to the accompanying drawings, embodiments of the present invention will be explained in detail below.

In the following descriptions, a case is described where a DSCH is used as a shared channel, but this is not a limitation, and the following embodiments can also be implemented in a case where a channel other than a DSCH is used as a shared channel.

(Embodiment 1)

In this embodiment, a case is described where an adaptive array is applied to DSCH signal transmission, and the DSCH is assigned to communication terminals in an order such that the difference in signal direction of arrival is minimized in the communication terminal to which the DSCH is assigned this time and the communication terminal to which the DSCH will be assigned next time.

Figure 1:
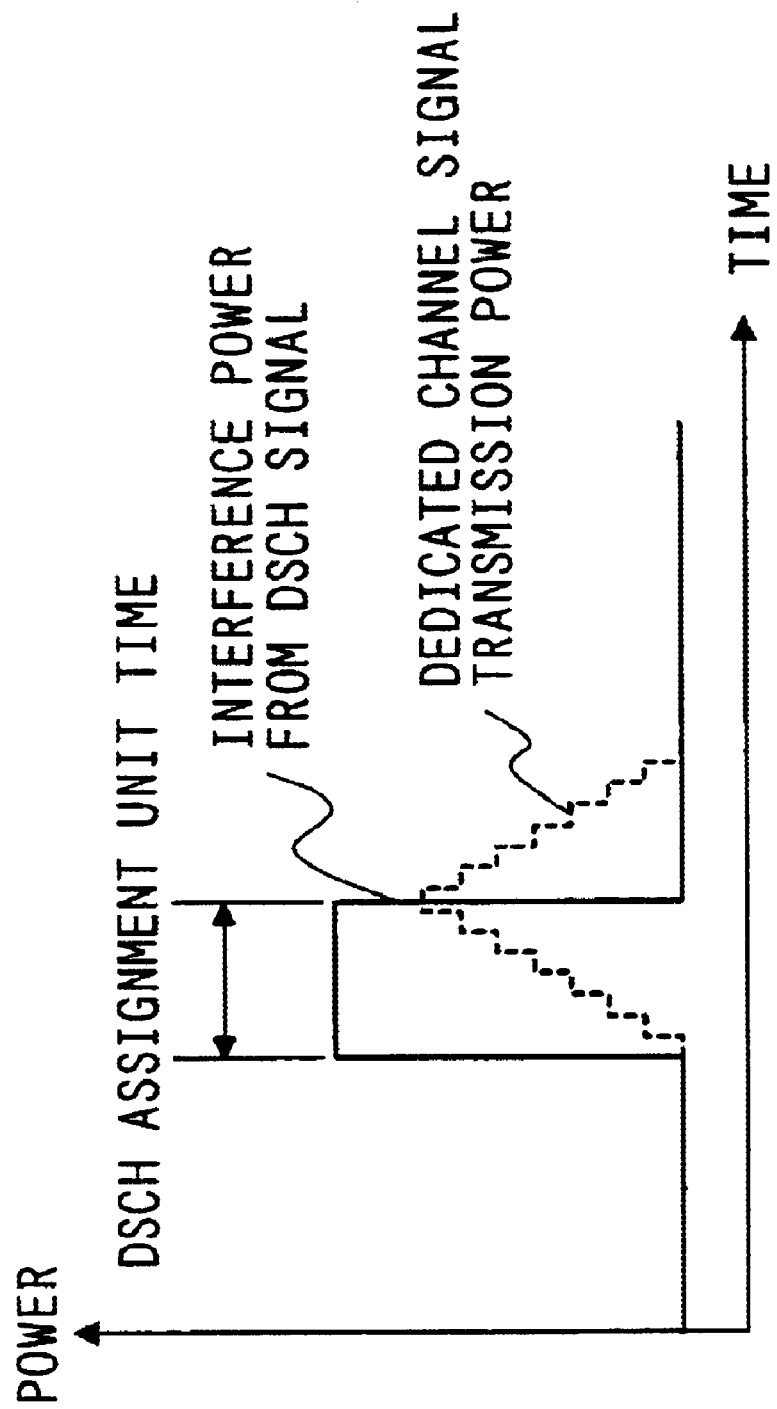
FIG. 1 is a drawing showing changes in interference power in a communication terminal when DSCH assignment is performed by a conventional base station apparatus.
Figure 2:
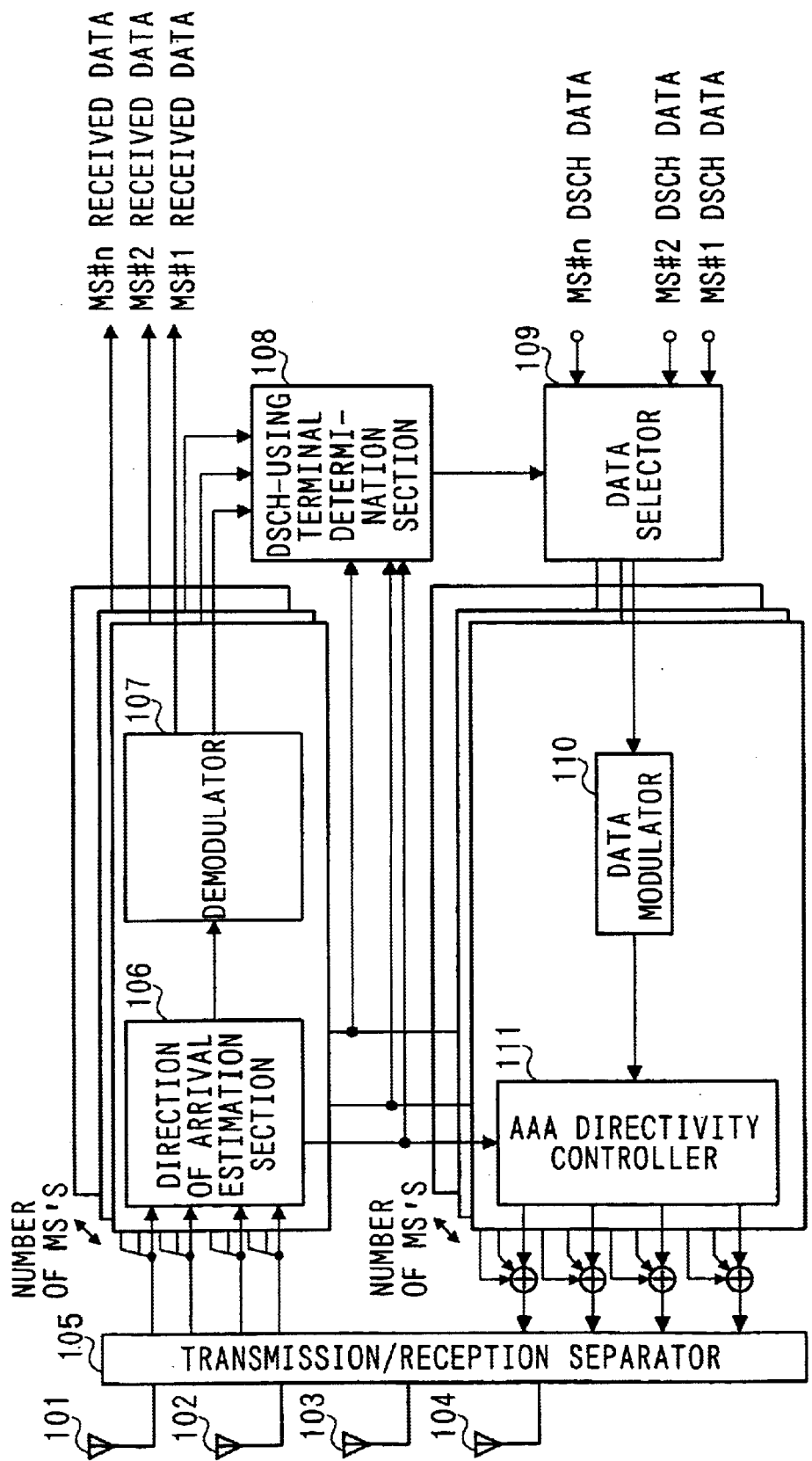
FIG. 2 is a main block diagram showing a schematic configuration of a base station apparatus according to Embodiment 1 of the present invention.

FIG. 2 is a main block diagram showing a schematic configuration of a base station apparatus according to Embodiment 1 of the present invention.

Signals on uplinks (channels from communication terminals to a base station) received via antennas 101 through 104 are received via a transmission/reception separator 105, and after undergoing predetermined radio reception processing (down-conversion, A/D conversion, etc.), are sent to a direction of arrival estimation section 106. In the direction of arrival estimation section 106, the received signals undergo array combining processing, after which despreading processing is performed and the received signal of each communication terminal (user) is extracted, and a direction of arrival is estimated for the received signals from the respective communication terminals. The results of this direction of arrival estimation are sent to an AAA directivity controller 111 and a DSCH-using terminal determination section 108. In addition, the received signals undergo demodulation processing by a demodulator 107 for each communication terminal and become received data.

A direction of arrival estimation section 106 and demodulator 107 are provided for each communication terminal (MS), and received data for each communication terminal (MS#1 received data through MS#n received data) is obtained from the respective demodulators 107.

Received data that has undergone demodulation processing is sent to the DSCH-using terminal determination section 108. In the DSCH-using terminal determination section 108, the communication terminal that will use the DSCH is determined based on communication terminals that have transmitted a request signal indicating a wish to use the DSCH and the direction of arrival of the signals transmitted from the respective communication terminals (that is, the directions estimated by the direction of arrival estimation section 106). The determination method will be described later herein. The DSCH-using terminal determination section 108 sends this determined information to a data selector 109.

The data selector 109 selects the DSCH data of the communication terminal that will use the DSCH from the DSCH data of each communication terminal (MS#1 DSCH data through MS#n DSCH data), and sends this to a data modulator 110. The data modulator 110 performs modulation processing and spreading processing on the DSCH data, and then sends a spread DSCH signal to the AAA directivity controller 111.

A data modulator 110 and AAA directivity controller 111 are provided for each communication terminal (MS).

The AAA directivity controller 111 forms a transmission directivity based on direction of arrival information estimated by the direction of arrival estimation section 106. That is to say, the AAA directivity controller 111 multiplies the DSCH signal from the data modulator 110 by weights corresponding to transmission directionalities (weights corresponding to antennas 101 through 104). DSCH signals multiplied by the weights are transmitted to the communication terminals from antennas 101 through 104 via the transmission/reception separator 105.

Next, the operation of a base station apparatus that has the above configuration will be described.

When a communication terminal requests use of the DSCH, it transmits a request signal to the base station on an uplink channel. In the base station, the request signal is demodulated by the demodulator 107, and then sent to the DSCH-using terminal determination section 108. The results of received signal direction of arrival estimation by the direction of arrival estimation section 106 are sent to the DSCH-using terminal determination section 108. The results of received signal direction of arrival estimation by the direction of arrival estimation section 106 are also sent to the DSCH-using terminal determination section 108. In the DSCH-using terminal determination section 108, the communication terminal that will use the DSCH is determined from the communication terminals from which a request signal was received and the direction of arrival of the received signals.

That is to say, all request signals are input to the DSCH-using terminal determination section 108, and it is therefore possible for the DSCH-using terminal determination section 108 to identify communication terminals that wish to use the DSCH. Also, since all direction of arrival estimation results for signals transmitted from communication terminals are input to the DSCH-using terminal determination section 108, it is possible for the DSCH-using terminal determination section 108 to determine communication terminals that will use the DSCH in order from the communication terminal whose direction of arrival is closest among communication terminals that wish to use the DSCH. That is to say, in the DSCH-using terminal determination section 108, the DSCH is successively assigned to communication terminals in order so that the difference in signal direction of arrival is minimized between the communication terminal to which the DSCH is assigned this time and the communication terminal to which the DSCH will be assigned next time. The assignment method will be described in detail later herein.

When a communication terminal that will use the DSCH is determined by the DSCH-using terminal determination section 108, that information is sent to the data selector 109. As DSCH data for all communication terminals (MS#1 DSCH data through MS#n DSCH data) is input to the data selector 109, the data selector 109 selects only DSCH data of the communication terminal that will use the DSCH from the DSCH data input to the data selector 109, and outputs this to the data modulator 110. In the data modulator 110, modulation processing is executed on the DSCH data for the communication terminal that will use the DSCH. In the data modulator 110, also, spreading processing is performed, using a predetermined spreading code, on DSCH data that has undergone modulation processing. DSCH data that has undergone spreading processing is sent to the AAA directivity controller 111.

In the AAA directivity controller 111, DSCH signal directivity is controlled based on directions of arrival estimated from received signals from communication terminals. That is to say, the AAA directivity controller 111 calculates a weight that will direct a beam to a communication terminal that transmits a signal on the DSCH, and multiplies the DSCH signal by that weight. A DSCH signal multiplied by a weight is transmitted to a communication terminal for which directivity has been directed—that is, the communication terminal that will use the DSCH.

Figure 3:
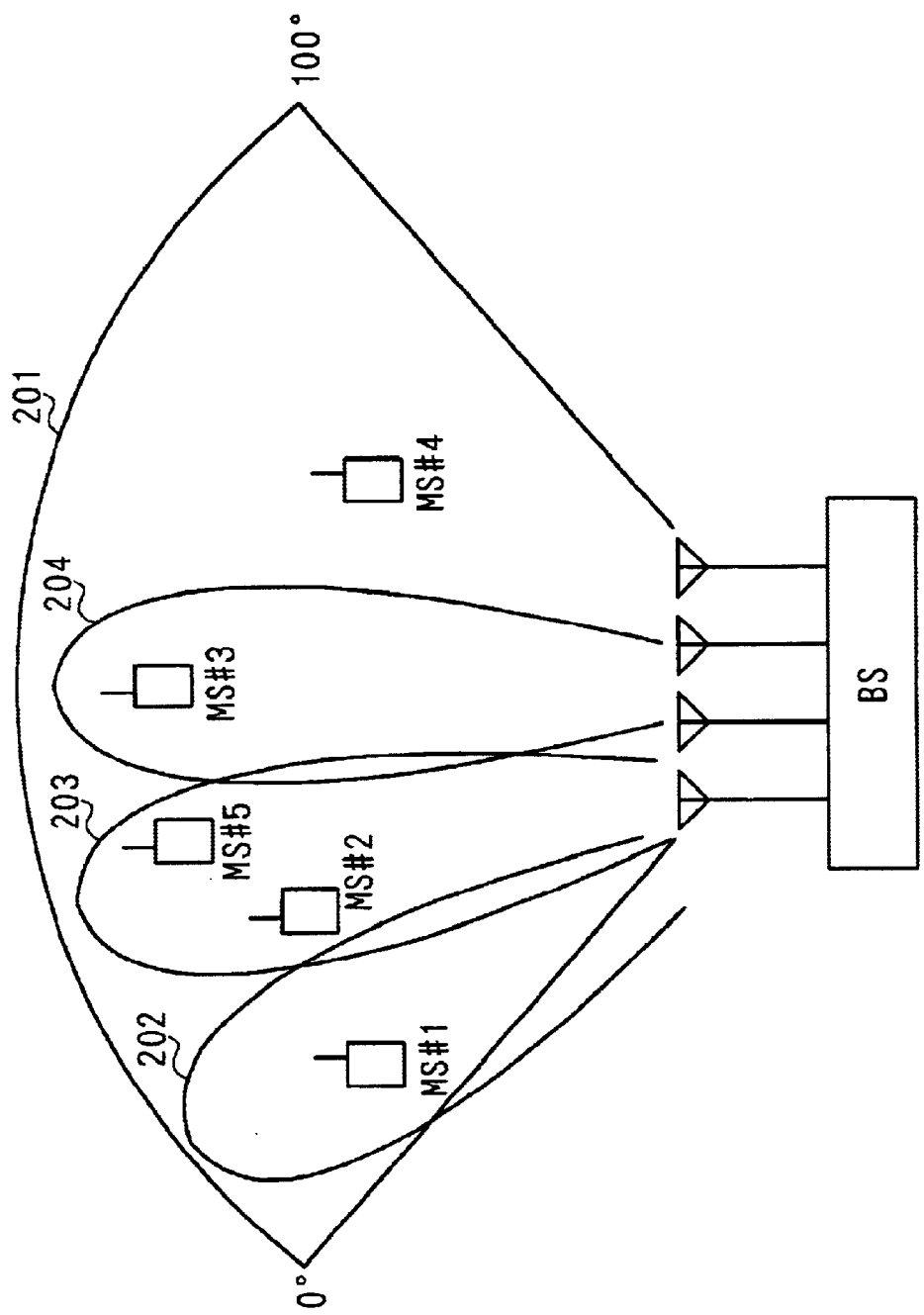
FIG. 3 is a drawing showing radiation patterns for explaining the operation of a base station apparatus according to Embodiment 1 of the present invention.

Next, the DSCH assignment method will be described in detail. FIG. 3 is a drawing showing radiation patterns for explaining the operation of a base station apparatus according to Embodiment 1 of the present invention, and FIG. 4 is a drawing showing changes in interference power in a communication terminal when DSCH assignment is performed by a base station apparatus according to Embodiment 1 of the present invention.

In FIG. 3, request signals indicating a wish to use the DSCH are transmitted to a base station (BS) according to this embodiment from, for example, communication terminals (MS) #1, #2, and #3. Also, since all direction of arrival estimation results for signals transmitted from communication terminals are input to the DSCH-using terminal determination section 108, the DSCH-using terminal determination section 108 successively assigns the DSCH to communication terminals #1 through #3 in order starting from the smallest angle indicating the direction of arrival.

That is to say, the DSCH-using terminal determination section 108 first assigns the DSCH to communication terminal #1, which has the smallest angle indicating direction of arrival within nondirectional transmission area 201, then assigns the DSCH to communication terminal #2, which has the smallest difference in direction of arrival from communication terminal #1, and then assigns the DSCH to communication terminal #3, which has the smallest difference in direction of arrival from communication terminal #2. Reference code 202 indicates the radiation pattern when a DSCH signal is transmitted to communication terminal #1, reference code 203 indicates the radiation pattern when a DSCH signal is transmitted to communication terminal #2, and reference code 204 indicates the radiation pattern when a DSCH signal is transmitted to communication terminal #3.

Figure 4:
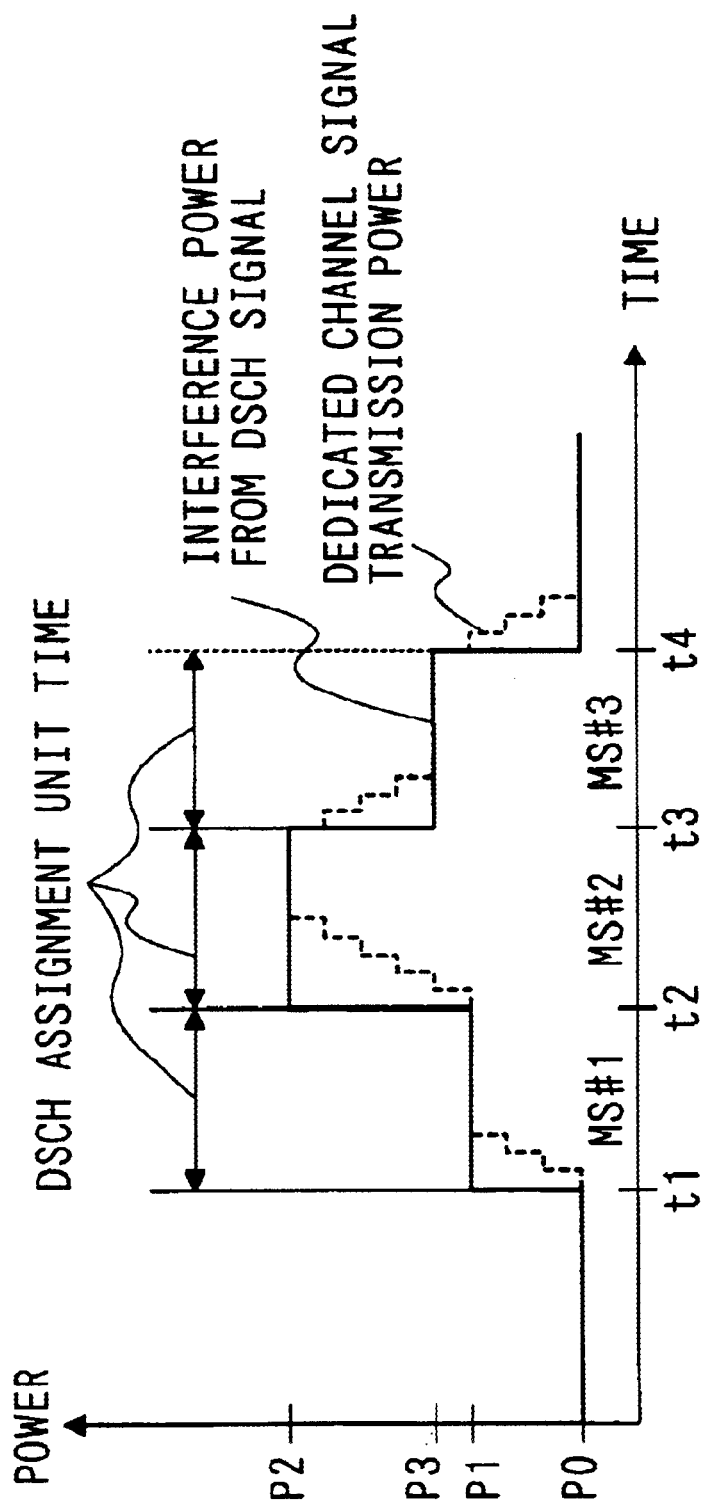
FIG. 4 is a drawing showing changes in interference power in a communication terminal when DSCH assignment is performed by a base station apparatus according to Embodiment 1 of the present invention.

Here, to consider communication terminal #5 located in the vicinity of communication terminal #2, when DSCH assignment is performed as described above, interference received from the DSCH signal by a dedicated channel signal transmitted to communication terminal #5 gradually changes as shown in FIG. 4.

That is to say, as the DSCH is assigned in the order communication terminal #1→communication terminal #2→communication terminal #3, in communication terminal #5 located in the vicinity of communication terminal #2, interference power received from the DSCH signal gradually increases as the transmission directivity of the DSCH signal approaches that terminal, and interference power received from the DSCH signal gradually decreases as the transmission directivity of the DSCH signal moves way from that terminal.

To be specific, as shown in FIG. 4, first, at t1, the DSCH is assigned to communication terminal #1, and therefore interference power in communication terminal #5 increases from P0 to P1, and remains at P1 until t2 when the DSCH is assigned to communication terminal #2. Then, at t2, since the DSCH is assigned to communication terminal #2, interference power in communication terminal #5 increases from P1 to P2, and remains at P2 until t3 when the DSCH is assigned to communication terminal #3. Then, at t3, since the DSCH is assigned to communication terminal #3, interference power in communication terminal #5 decreases from P2 to P3, and remains at P3 until t4 when DSCH assignment to communication terminal #3 ceases. Then, at t4, when DSCH assignment has ceased for all of communication terminals #1 through #3, interference power in communication terminal #5 decreases from P3 to P0.

In FIG. 4, P0 indicates interference power received by a dedicated channel signal for communication terminal #5 from signals other than a DSCH signal—that is, interference power received from dedicated channel signals for other communication terminals within the same cell, and the like.

Thus, for communication terminal #5 located in the vicinity of communication terminal #2, since DSCH signal transmission directivity gradually approaches that terminal, interference power received from a DSCH signal also gradually increases. Therefore, as shown in FIG. 4, the tracking ability of transmission power control with respect to a dedicated channel signal transmitted to communication terminal #5 is improved. That is to say, increases in transmission power of a dedicated channel by means of transmission power control in a downlink can track increases in interference power from a DSCH signal. Thus, in communication terminal #5, it is possible for deterioration of reception quality due to interference received from a DSCH signal to be reduced by means of transmission power control.

In the above description, it has been assumed that the DSCH is assigned in order starting from communication terminal #1, which has the smallest angle indicating direction of arrival, but the DSCH may also be assigned in order starting from communication terminal #3, which has the largest angle indicating direction of arrival. That is to say, the DSCH may be assigned in the order communication terminal #3→communication terminal #2→communication terminal #1.

Thus, according to this embodiment, an adaptive array is applied to DSCH signal transmission, and the DSCH is assigned to communication terminals in order so that the difference in signal direction of arrival is minimized between the communication terminal to which the DSCH is assigned this time and the communication terminal to which the DSCH will be assigned next time, so that interference power received from a DSCH signal increases gradually, and not abruptly, in a communication terminal located in the vicinity of a communication terminal to which the DSCH is assigned, and therefore increases in dedicated channel signal transmission power can track increases in interference power received from the DSCH signal, and deterioration of reception quality due to interference received from the DSCH signal can be reduced. Furthermore, since interference power received from the DSCH signal decreases gradually, the tracking ability of transmission power control that decreases dedicated channel signal transmission power is also improved, making possible an increase in system capacity.

(Embodiment 2)

When the DSCH assignment order is determined in accordance with only signal direction of arrival, as described in Embodiment 1 above, the assignment order is not necessarily the optimal assignment order for communication terminals requesting DSCH assignment. This is because there already exists a DSCH assignment priority order that takes account of propagation path conditions, communication throughput, and so forth, indicated by the reception SIR, etc., for each communication terminal requesting DSCH assignment.

Thus, in this embodiment, a case is described where the DSCH assignment order is determined in accordance with signal direction of arrival, while taking account of this priority order. By this means it is possible to reduce deterioration of reception quality due to interference received from a DSCH signal while performing optimal assignment from the viewpoint of DSCH signal transmission efficiency.

Figure 5:
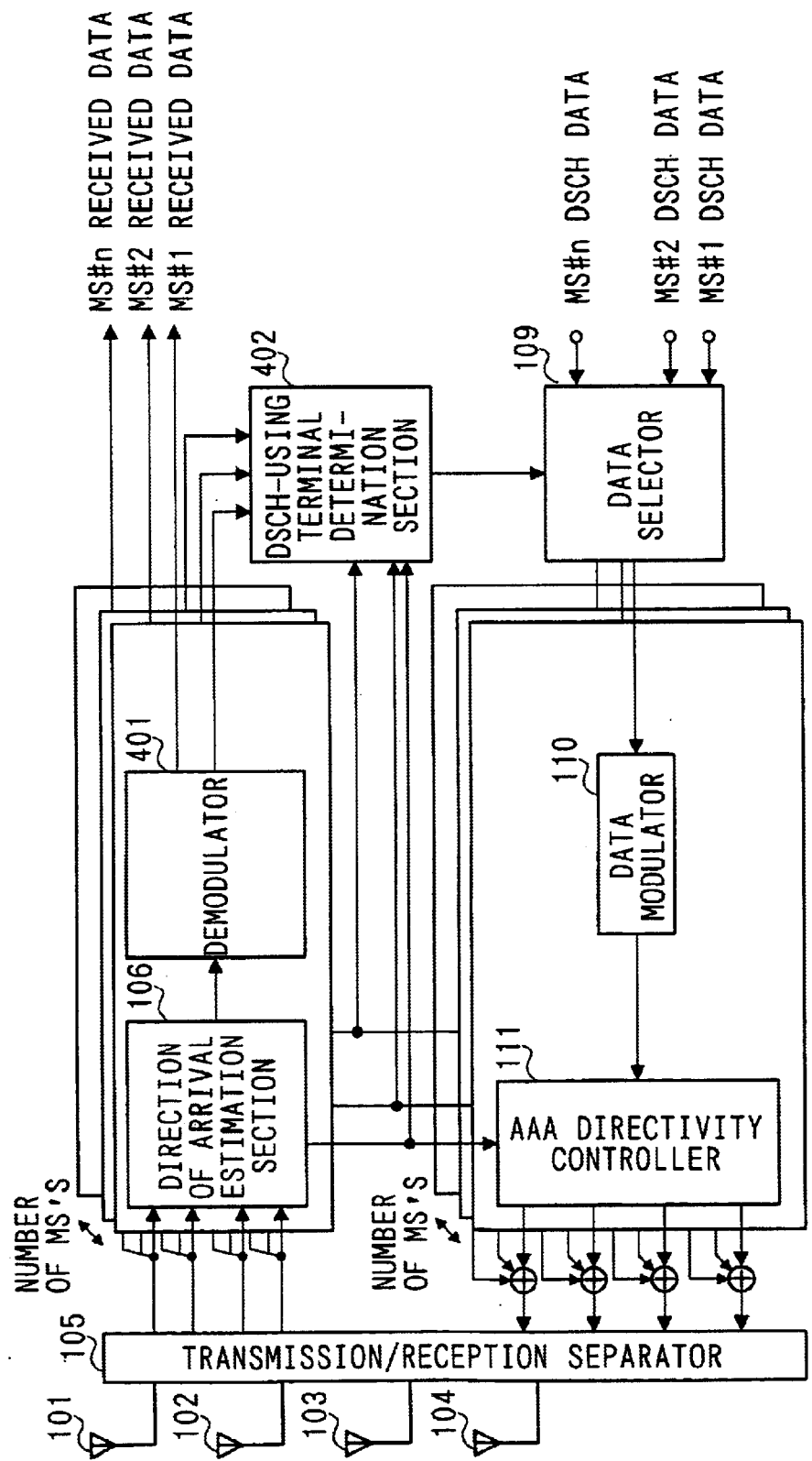
FIG. 5 is a main block diagram showing a schematic configuration of a base station apparatus according to Embodiment 2 of the present invention.

FIG. 5 is a main block diagram showing a schematic configuration of a base station apparatus according to Embodiment 2 of the present invention. Parts in FIG. 2 identical to those in Embodiment 1 are assigned the same codes as in Embodiment 1 and their detailed explanations are omitted.

In FIG. 5, a demodulator 401 separates information (such as a communication terminal reception SIR, for example) indicating downlink channel quality sent from a communication terminal from a demodulated received signal, and sends this information to a DSCH-using terminal determination section 402. In the DSCH-using terminal determination section 402, the communication terminal that will use the DSCH is determined based on communication terminals that have transmitted a request signal indicating a wish to use the DSCH, information indicating downlink channel quality, and the direction of arrival of the signals transmitted from the respective communication terminals. That is to say, the DSCH-using terminal determination section 402 determines the DSCH assignment order by adding a priority order indicated by downlink channel quality to signal direction of arrival. To be specific, this determination is carried out as described below.

Figure 6:
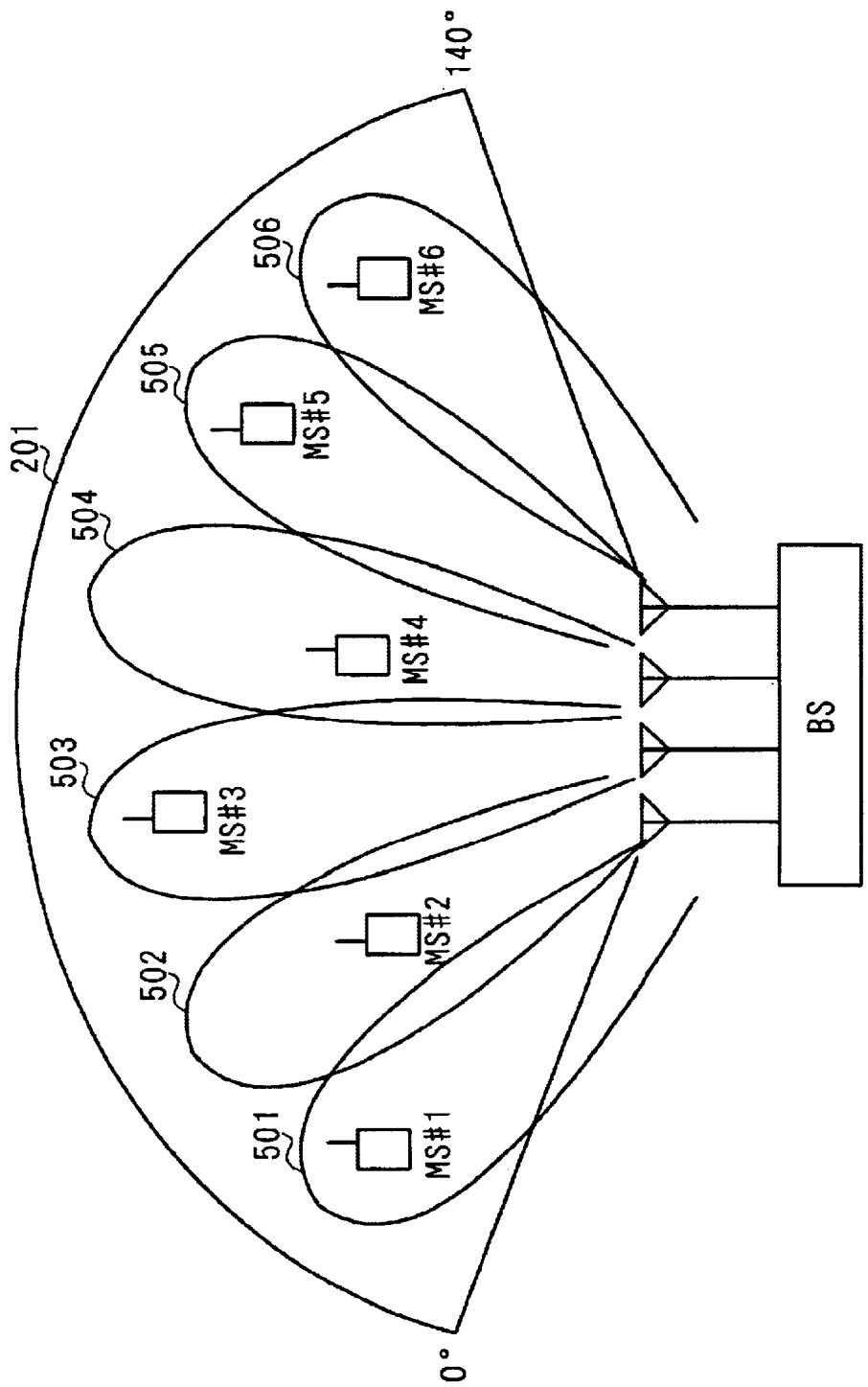
FIG. 6 is a drawing showing radiation patterns for explaining the operation of a base station apparatus according to Embodiment 2 of the present invention.

FIG. 6 is a drawing showing radiation patterns for explaining the operation of a base station apparatus according to Embodiment 2 of the present invention, and FIG. 7 shows tables for explaining the DSCH assignment order method of a base station apparatus according to Embodiment 2 of the present invention.

In FIG. 6, it is assumed that request signals indicating a wish to use the DSCH are transmitted from communication terminals #1 through #6. Reference code 201 indicates the nondirectional transmission area, and reference codes 501 through 506 indicate the radiation patterns when DSCH signals are transmitted to communication terminals #1 through #6, respectively.

The DSCH-using terminal determination section 402 first assigns a priority to each of communication terminals #1 through #6 according to downlink channel quality, and then adds the direction of arrival of the signal transmitted from each of communication terminals #1 through #6 as an angle of arrival. Here, it is assumed that the received signal angle of arrival increases in the order of communication terminals #1 through #6 shown in FIG. 6. Also, it is assumed that downlink channel quality improves in the order: communication terminal #4, #2, #1, #3, #5, #6. Thus, the DSCH-using terminal determination section 402 first creates a table such as that shown in FIG. 7A.

Next, the DSCH-using terminal determination section 402 calculates evaluation numeric values incorporating angle of arrival and priority. That is to say, the DSCH-using terminal determination section 402 calculates evaluation numeric values that take account of the direction of arrival of each signal together with channel quality. The evaluation numeric value is calculated using the following equation.

Evaluation numeric value=angle of arrival/(total number of communication terminals transmitting a request signal+1−priority)

The divisors and evaluation numeric values are thus as shown in FIG. 7B.

The DSCH-using terminal determination section 402 then determines the DSCH assignment order in accordance with these evaluation numeric values. That is to say, the DSCH-using terminal determination section 402 assigns the DSCH in order starting from the communication terminal with the lowest evaluation numeric value. Thus, in the example shown in FIG. 7B, the DSCH is assigned in the order: communication terminal #3, #2, #1, #4, #5, #6.

In this embodiment, evaluation numeric values are not limited to evaluation numeric values calculated using the above equation, and any values may be used as long as they are evaluation numeric values that enable the DSCH assignment order to be determined by taking account of signal direction of arrival together with channel quality.

Also, the angle used as the criterion for received signal direction of arrival may be fixed anywhere within the range within which communication terminals are present—that is, within the nondirectional transmission area.

Thus, according to this embodiment, the DSCH assignment order is determined using a value obtained by weighting a priority established according to downlink channel quality with a value indicating the direction of arrival of a signal, thereby making it possible to perform optimal DSCH assignment that takes both downlink channel quality and signal direction of arrival into consideration. It is thus possible to reduce deterioration of reception quality due to interference received from a DSCH signal while performing optimal assignment from the viewpoint of DSCH signal transmission efficiency.

(Embodiment 3)

In this embodiment, a case is described where, prior to the start of DSCH signal transmission, a dummy signal is transmitted while gradually increasing its transmission power. By this means, a communication terminal located in the vicinity of a communication terminal to which the DSCH is assigned receives interference from a DSCH signal after interference power has been gradually increased.

Figure 8:
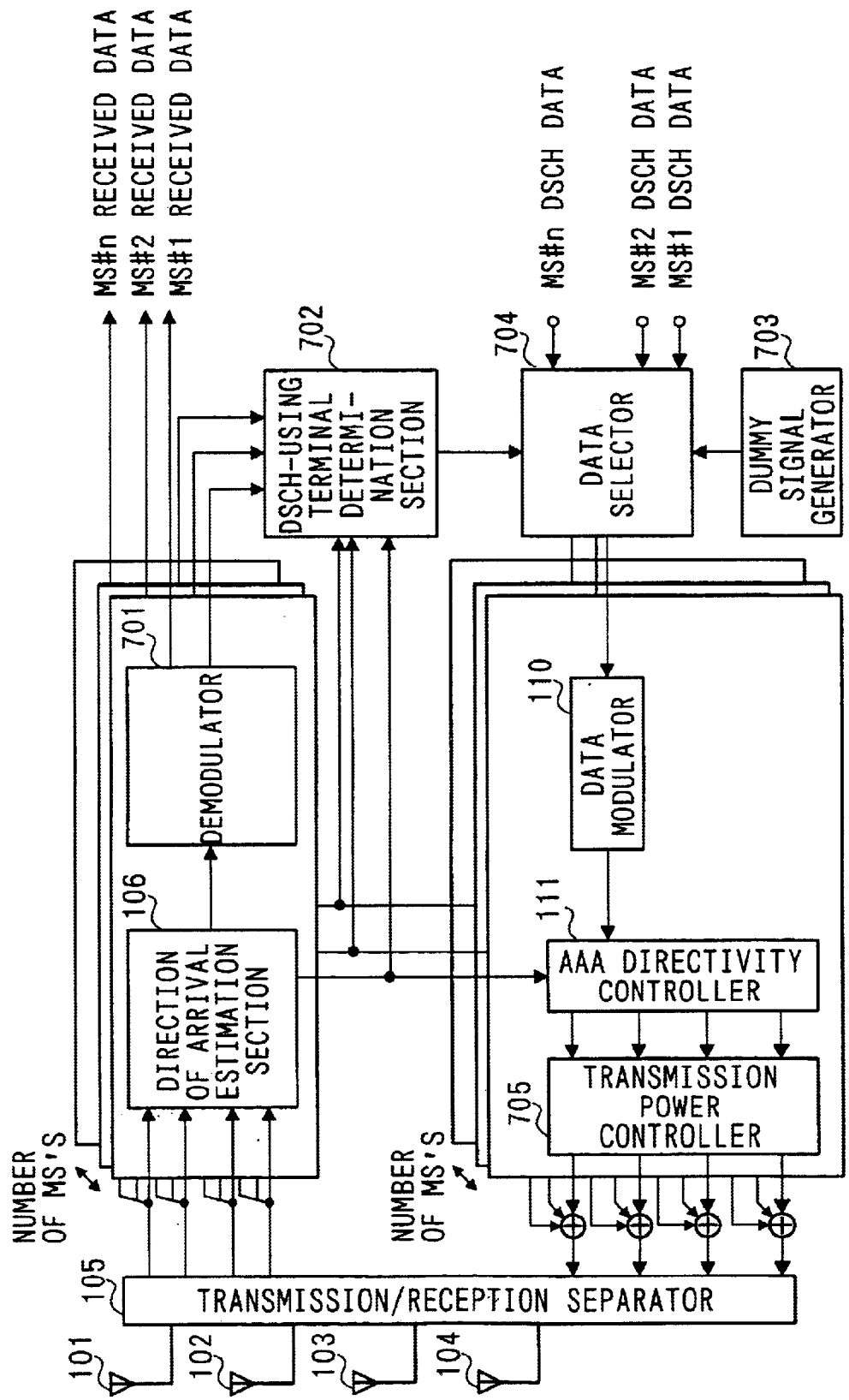
FIG. 8 is a main block diagram showing a schematic configuration of a base station apparatus according to Embodiment 3 of the present invention.

FIG. 8 is a main block diagram showing a schematic configuration of a base station apparatus according to Embodiment 3 of the present invention. Parts in FIG. 8 identical to those in Embodiment 1 are assigned the same codes as in Embodiment 1 and their detailed explanations are omitted.

In FIG. 8, a demodulator 701 separates information (such as a communication terminal reception SIR, for example) indicating downlink channel quality sent from a communication terminal from a demodulated received signal, and sends this information to a DSCH-using terminal determination section 702. In the DSCH-using terminal determination section 702, the communication terminal that will use the DSCH is determined based on communication terminals that have transmitted a request signal indicating a wish to use the DSCH, and information indicating downlink channel quality. That is to say, the DSCH-using terminal determination section 702 determines terminals to which the DSCH is to be assigned in order of downlink channel quality (high to low).

A data selector 704 selects the DSCH data of the communication terminal that will use the DSCH from the DSCH data of each communication terminal (MS#1 DSCH through MS#n DSCH data), adds at the head of this selected DSCH data a dummy signal of predetermined length generated by a dummy signal generator 703, and sends the data to a data modulator 110.

The data modulator 110 performs modulation processing and spreading processing on the DSCH data with a dummy signal added at its head, and then sends the spread DSCH signal to an AAA directivity controller 111. In the AAA directivity controller 111, the DSCH signal from the data modulator 110 is multiplied by weights corresponding to transmission directionalities, and the resulting signals are sent to a transmission power controller 705.

The transmission power controller 705 controls the transmission power of the DSCH signals output from the AAA directivity controller 111, and then outputs the signals to the communication terminals via the transmission/reception separator 105 and antennas 101 through 104. That is to say, when a dummy signal is transmitted, the transmission power controller 705 transmits the dummy signal while gradually increasing the dummy signal transmission power up to a predetermined DSCH signal transmission power value. Also, when transmission of a dummy signal of a predetermined length ends and DSCH signal transmission is started, the transmission power controller 705 sets the DSCH signal to the predetermined transmission power.

Figure 9:
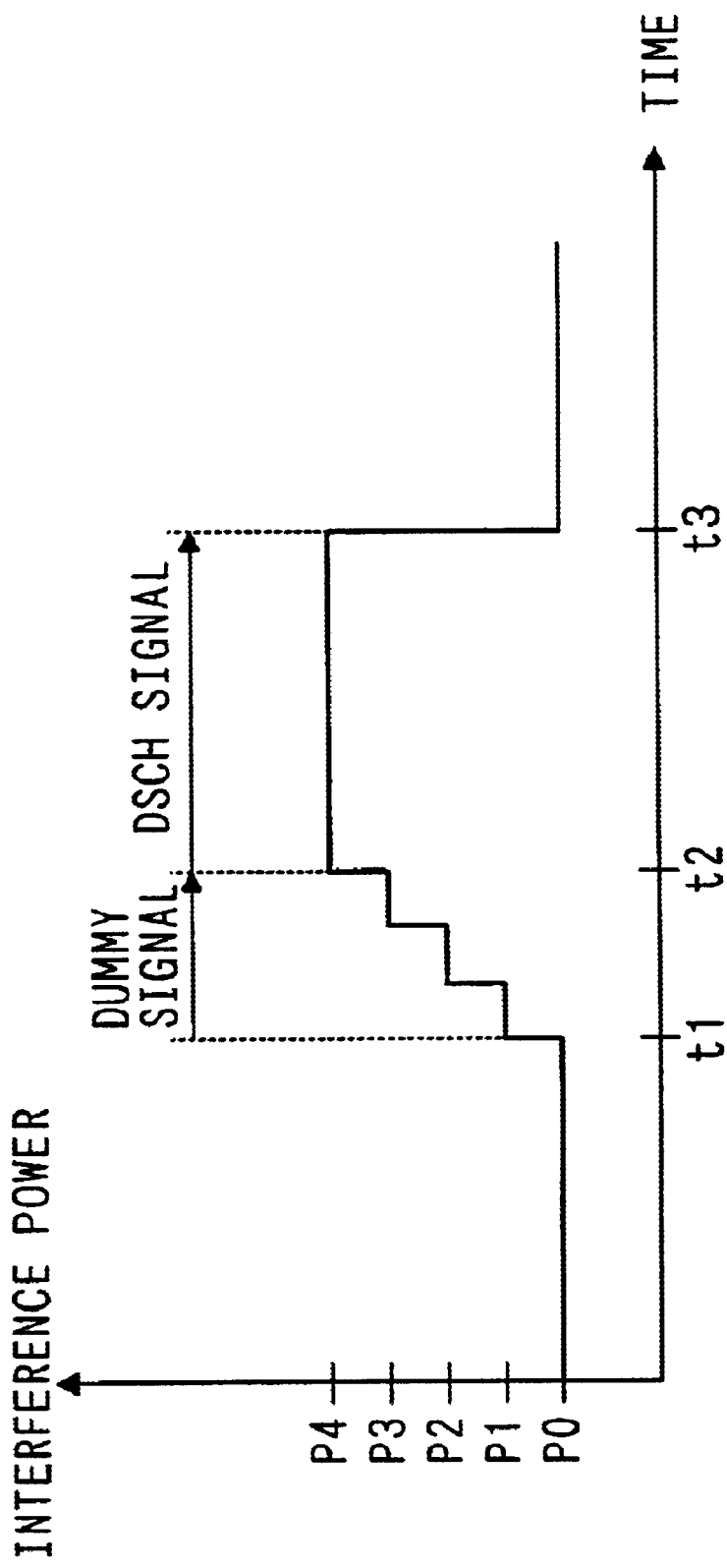
FIG. 9 is a drawing showing changes in interference power in a communication terminal when DSCH assignment is performed by a base station apparatus according to Embodiment 3 of the present invention.

When a dummy signal whose transmission power has been gradually increased up to a predetermined DSCH signal transmission power value is transmitted prior to DSCH signal transmission, as described above, interference received from a DSCH signal by a dedicated channel signal transmitted to a communication terminal located in the vicinity of a communication terminal to which the DSCH is assigned changes gradually as shown in FIG. 9.

FIG. 9 is a drawing showing changes in interference power in a communication terminal when DSCH assignment is performed by a base station apparatus according to Embodiment 3 of the present invention.

That is to say, since a dummy signal whose transmission power has been gradually increased is transmitted prior to the start of DSCH signal transmission to a communication terminal to which the DSCH is assigned, interference power received from a DSCH signal by a communication terminal located in the vicinity of a communication terminal to which the DSCH is assigned changes gradually prior to the start of DSCH signal transmission, as shown in FIG. 9.

To be specific, assuming that DSCH signal transmission starts at t2 shown in FIG. 9, in the period from t1 to t2 a base station apparatus according to this embodiment transmits a dummy signal whose transmission power is gradually increased. Thus, in a communication terminal located in the vicinity of a communication terminal to which the DSCH is assigned, interference power gradually increases from P0 to P4 in the period from t1 to t2 prior to the start of DSCH signal transmission. Consequently, in a communication terminal located in the vicinity of a communication terminal to which the DSCH is assigned, it is possible for downlink transmission power control for a dedicated channel signal to adequately track increases in interference power.

In FIG. 9, P0 indicates interference power received by a dedicated channel signal for communication terminal #5 from signals other than a DSCH signal—that is, interference power received from dedicated channel signals for other communication terminals within the same cell, and the like.

An optimal value is set as appropriate for the rate of increase of dummy signal transmission power, taking account of the DSCH signal transmission power and the tracking ability of transmission power control for a downlink dedicated channel signal. It is also possible for the dummy signal transmission time and transmission power rate of increase to be made variable.

Also, part of the DSCH signal may be transmitted as a dummy signal. That is to say, prior to the start of DSCH signal transmission, the first part of the DSCH signal may be transmitted repeatedly as a dummy signal.

Furthermore, after DSCH signal transmission ends, it is possible to transmit a dummy signal while gradually decreasing its transmission power. By this means, interference power is gradually decreased, and therefore the tracking ability of transmission power control that decreases dedicated channel signal transmission power is improved, enabling system stabilization to be achieved.

Thus, according to this embodiment, prior to the start of DSCH signal transmission, a dummy signal is transmitted while gradually increasing its transmission power, and consequently interference power received from a DSCH signal increases gradually, and not abruptly, in a communication terminal located in the vicinity of a communication terminal to which the DSCH is assigned, so that increases in dedicated channel signal transmission power can track increases in interference power by means of downlink transmission power control for a dedicated channel signal, and deterioration of reception quality due to interference received from the DSCH signal can be reduced.

(Embodiment 4)

In this embodiment, a case is described where the transmission power of a dedicated channel signal transmitted to a communication terminal located in the vicinity of a communication terminal to which the DSCH is assigned is increased when DSCH signal transmission is started.

Figure 10:
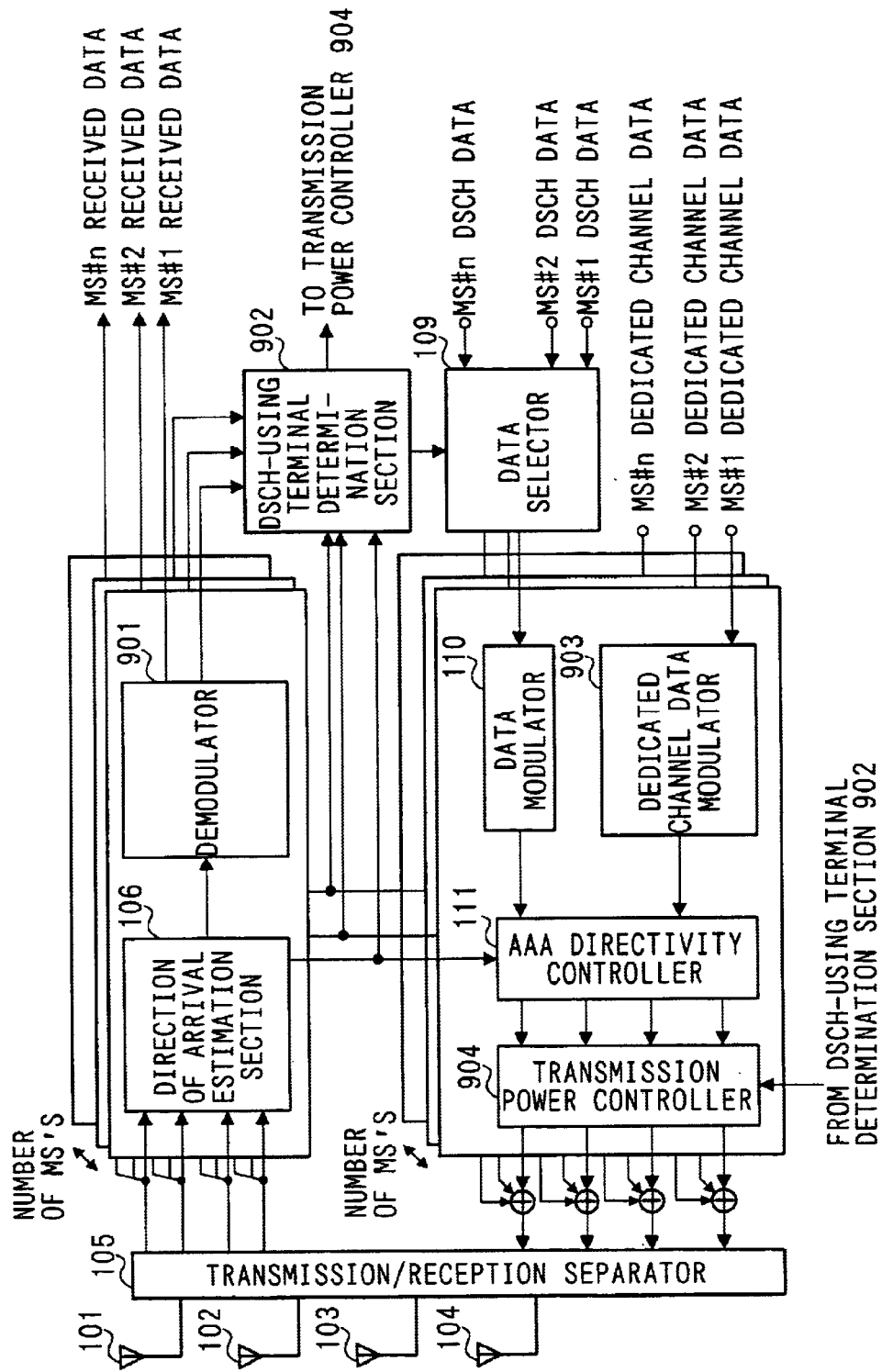
FIG. 10 is a main block diagram showing a schematic configuration of a base station apparatus according to Embodiment 4 of the present invention.

FIG. 10 is a main block diagram showing a schematic configuration of a base station apparatus according to Embodiment 4 of the present invention. Parts in FIG. 10 identical to those in Embodiment 1 are assigned the same codes as in Embodiment 1 and their detailed explanations are omitted.

In FIG. 10, a demodulator 901 separates information (such as a communication terminal reception SIR, for example) indicating downlink channel quality sent from a communication terminal from a demodulated received signal, and sends this information to a DSCH-using terminal determination section 902. In the DSCH-using terminal determination section 902, the communication terminal that will use the DSCH is determined based on communication terminals that have transmitted a request signal indicating a wish to use the DSCH, and information indicating downlink channel quality. That is to say, the DSCH-using terminal determination section 902 determines terminals to which the DSCH is to be assigned in order of downlink channel quality (high to low).

The DSCH-using terminal determination section 902 also specifies a communication terminal located in the vicinity of a communication terminal to which the DSCH is assigned from received signal direction of arrival estimation results output from a direction of arrival estimation section 106, and notifies a transmission power controller 904 of the specified communication terminal.

A dedicated channel data modulator 903 performs modulation processing and spreading processing on dedicated channel data for each communication terminal (MS#1 dedicated channel data through MS#n dedicated channel data), and then sends a spread dedicated channel signal to an AAA directivity controller 111. A dedicated channel data modulator 903 is provided for each communication terminal (MS).

When DSCH signal transmission is started, the transmission power controller 904 increases the transmission power of a dedicated channel signal to a communication terminal specified by the DSCH-using terminal determination section 902 up to a predetermined value. Also, when DSCH signal transmission ends and DSCH signal transmission is started, the transmission power controller 904 decreases the transmission power of a dedicated channel signal to a communication terminal specified by the DSCH-using terminal determination section 902 down to the transmission power value prior to being increased, restoring it to the original transmission power value. Dedicated channel signals whose transmission power has been controlled are transmitted to the communication terminals via a transmission/reception separator 105, and antennas 101 through 104.

The operation of the transmission power controller 904 is illustrated in FIG. 11. FIG. 11 comprises drawings showing time-wise changes in dedicated channel signal transmission power and DSCH signal transmission power in a base station apparatus according to Embodiment 4 of the present invention.

Figures 11A, 11B:
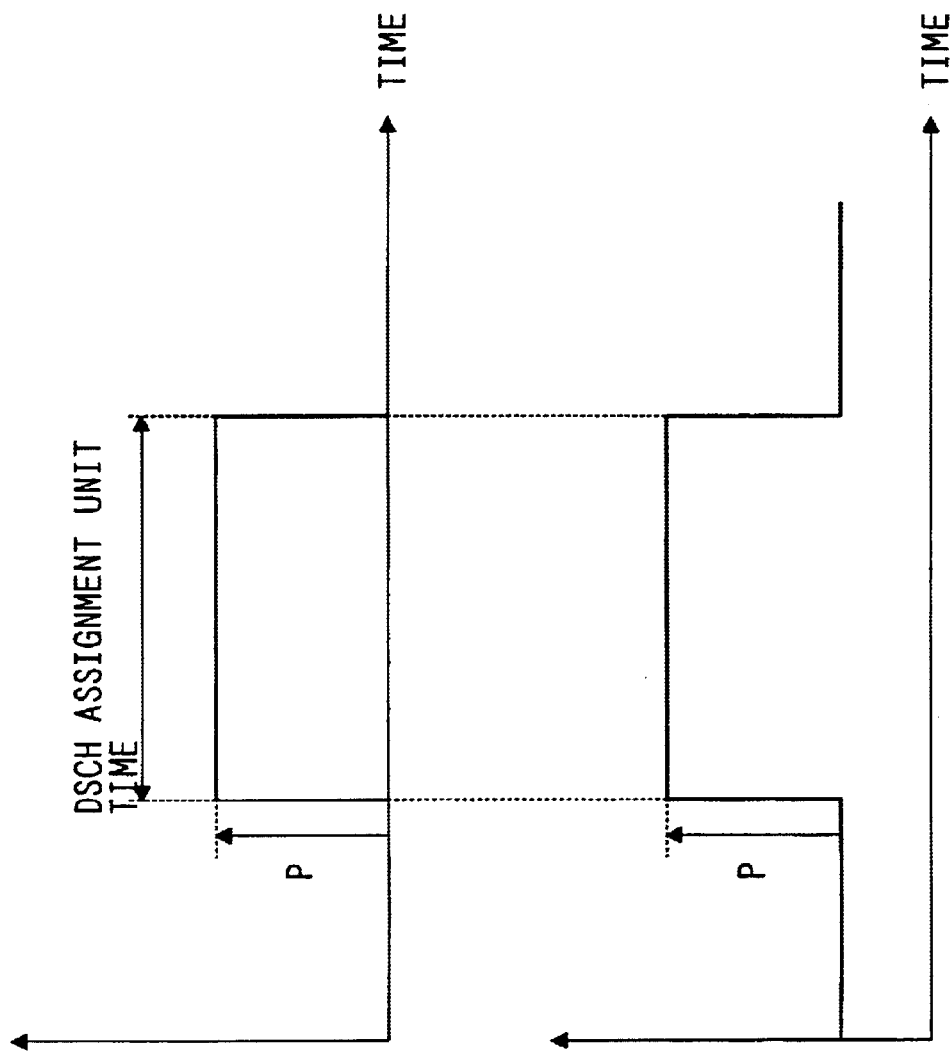
FIG. 11A is a drawing showing time-wise changes in dedicated channel signal transmission power and DSCH signal transmission power in a base station apparatus according to Embodiment 4 of the present invention.
FIG. 11B is a drawing showing time-wise changes in dedicated channel signal transmission power and DSCH signal transmission power in a base station apparatus according to Embodiment 4 of the present invention.

As shown in FIG. 11A and FIG. 11B, in the transmission power controller 904, at the same time as DSCH signal transmission to communication terminal #1 to which the DSCH is assigned is started at transmission power P, the transmission power of a dedicated channel signal to communication terminal #2 located in the vicinity of communication terminal #1 is increased by P, equivalent to the transmission power value of the DSCH signal. That is to say, although interference power received from the DSCH signal to communication terminal #1 increases, the transmission power of the dedicated channel signal to communication terminal #2 is increased sufficiently to compensate for the deterioration of reception quality due to that increase in interference power. By this means it is possible for dedicated channel signal reception quality before and after the start of DSCH signal transmission to be maintained at a predetermined desired quality in communication terminal #2 located in the vicinity of communication terminal #1 to which a DSCH signal is transmitted.

In the above description, the amount of increase in the DSCH signal transmission power value and the amount of increase in the dedicated channel signal transmission power value are the same, but they need not be the same. That is to say, as the magnitude of interference imposed on a dedicated channel signal by a DSCH signal increases as the distance between the communication terminal to which the DSCH is assigned and a communication terminal located in the vicinity of that communication terminal decreases, it is also possible for an optimal amount of increase in the dedicated channel signal transmission power value to be decided upon adaptively according to that distance.

Thus, according to this embodiment, the transmission power of a dedicated channel signal transmitted to a communication terminal located in the vicinity of a communication terminal to which the DSCH is assigned is increased when DSCH signal transmission is started, thereby making it possible for dedicated channel signal reception quality to be maintained at a predetermined desired quality in a communication terminal located in the vicinity of a communication terminal to which the DSCH is assigned even when DSCH signal transmission is started.

(Embodiment 5)

In this embodiment, a case is described where, before DSCH signal transmission is started, notification of the fact that DSCH signal transmission is to be started is given to a communication terminal located in the vicinity of a communication terminal to which the DSCH is assigned, and the communication terminal notified of this requests the base station to increase transmission power according to the current dedicated channel signal reception quality.

Figure 12:
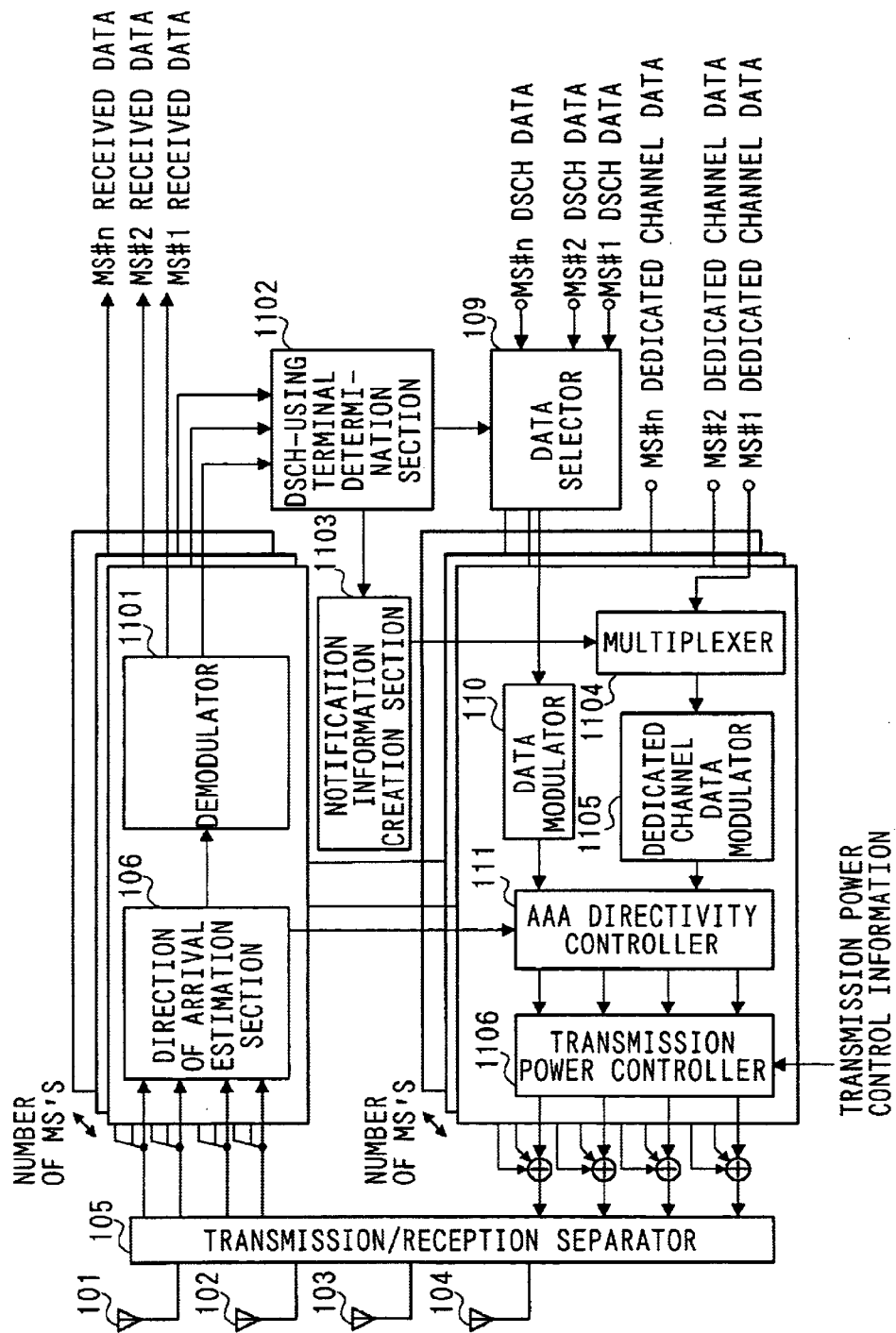
FIG. 12 is a main block diagram showing a schematic configuration of a base station apparatus according to Embodiment 5 of the present invention.
Figure 13:
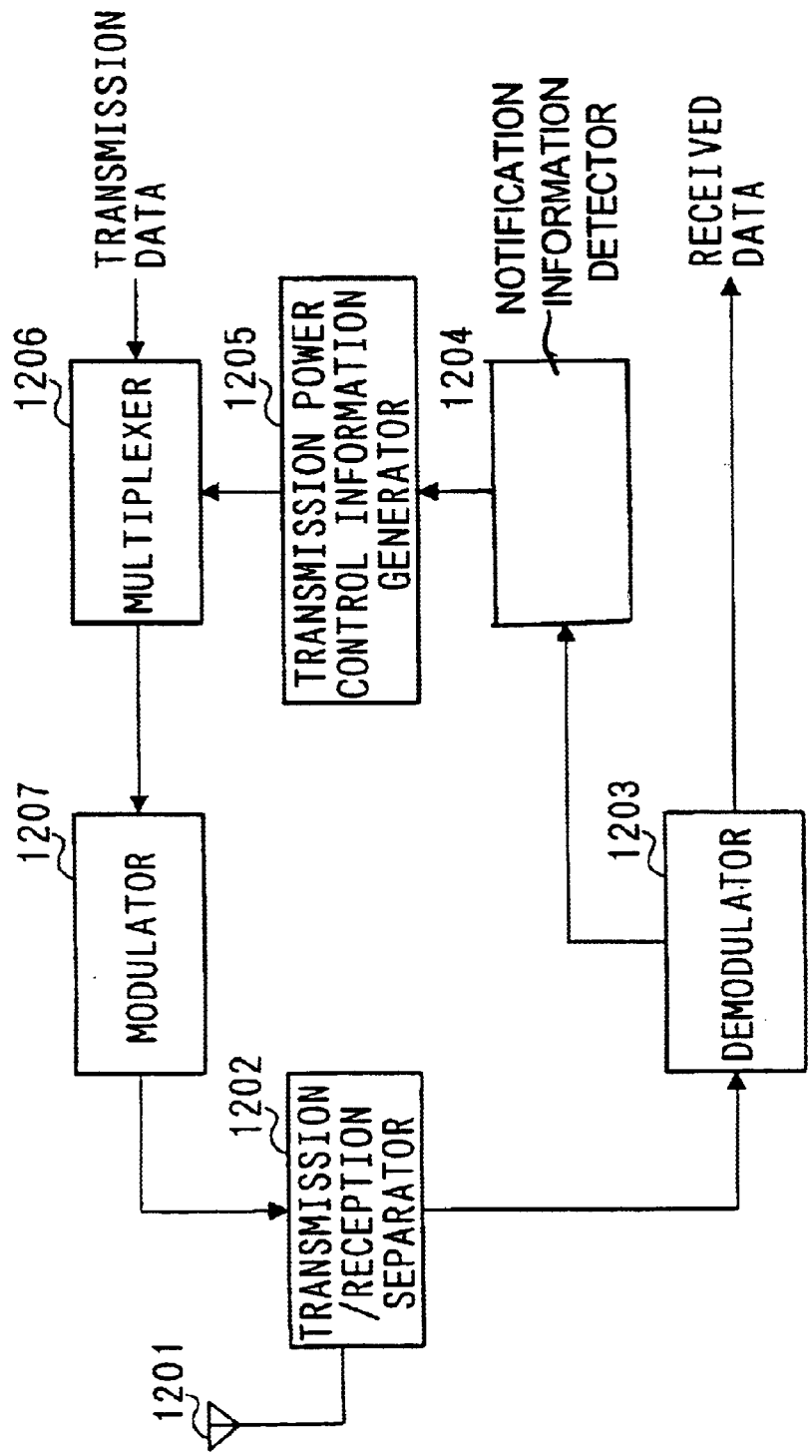
FIG. 13 is a main block diagram showing a schematic configuration of a communication terminal apparatus according to Embodiment 5 of the present invention.

FIG. 12 is a main block diagram showing a schematic configuration of a base station apparatus according to Embodiment 5 of the present invention. Parts in FIG. 12 identical to those in Embodiment 1 are assigned the same codes as in Embodiment 1 and their detailed explanations are omitted. FIG. 13 is a main block diagram showing a schematic configuration of a communication terminal apparatus according to Embodiment 5 of the present invention.

In FIG. 12, a demodulator 1101 separates information (such as a communication terminal reception SIR, for example) indicating downlink channel quality sent from a communication terminal from a demodulated received signal, and sends this information to a DSCH-using terminal determination section 1102. In the DSCH-using terminal determination section 1102, the communication terminal that will use the DSCH is determined based on communication terminals that have transmitted a request signal indicating a wish to use the DSCH, and information indicating downlink channel quality. That is to say, the DSCH-using terminal determination section 1102 determines terminals to which the DSCH is to be assigned in order of downlink channel quality (high to low).

The DSCH-using terminal determination section 1102 also specifies a communication terminal located in the vicinity of a communication terminal to which the DSCH is assigned from received signal direction of arrival estimation results output from a direction of arrival estimation section 106, and notifies a notification information creation section 1103 of the specified communication terminal. The notification information creation section 1103 creates information (hereinafter referred to as "transmission start notification information") for notifying that DSCH signal transmission has started to the communication terminal specified by the DSCH-using terminal determination section 1102 and a communication terminal located in the vicinity of that specified communication terminal, and outputs this information to a multiplexer 1104 corresponding to the communication terminal specified by the transmission controller 102. In the multiplexer 1104, the transmission start notification information is multiplexed with dedicated channel data and output to a dedicated channel data modulator 1105.

The dedicated channel data modulator 1105 performs modulation processing and spreading processing on dedicated channel data with which transmission start notification information has been multiplexed, and then sends a spread dedicated channel signal to an AAA directivity controller 111. In the AAA directivity controller 111, the dedicated channel signal is multiplied by weights corresponding to transmission directionalities, and the resulting signals are sent to a transmission power controller 1106 and are transmitted to the communication terminals via a transmission/reception separator 105 and antennas 101 through 104. Thus, in the base station, DSCH signal transmission is started to the communication terminal to which the DSCH is assigned after transmission start notification information transmission has been performed for a predetermined interval.

Meanwhile, in the communication terminal apparatus shown in FIG. 13, a dedicated channel signal with which transmission start notification information has been multiplexed is received via an antenna 102 and transmission/reception separator 1202, and undergoes despreading processing and demodulation processing in a demodulator 1203. By this means, dedicated channel data (received data) is obtained.

Also, a notification information detector 1204 detects transmission start notification information multiplexed with the demodulated dedicated channel signal, and outputs a signal indicating that this information has been detected to a transmission power control information generator 1205.

The transmission power control information generator 1205 generates transmission power control information for performing dedicated channel signal transmission power control at the base station, taking the current downlink channel quality into consideration, and outputs this information to a multiplexer 1206.

That is to say, when it is predicted that dedicated channel signal reception quality will deteriorate due to the start of DSCH signal transmission and the predetermined desired quality cannot be maintained, the transmission power control information generator 1205 generates transmission power control information directing the base station to increase the dedicated channel signal transmission power value. Also, if dedicated channel signal reception quality is currently of excessive quality and it is predicted that dedicated channel signal reception quality can be maintained at the predetermined desired quality even if DSCH signal transmission is started, the transmission power control information generator 1205 generates transmission power control information directing the base station to maintain the dedicated channel signal transmission power value at the current transmission power control. As the DSCH signal transmission power value is known, it is possible for the transmission power control information generator 1205 to estimate approximately to what extent dedicated channel signal reception quality will deteriorate when DSCH signal transmission to a communication terminal located in the vicinity is started.

Transmission data (dedicated channel data) with which transmission power control information has been multiplexed by the multiplexer 1206 undergoes modulation processing and spreading processing by a modulator 1207, and is then transmitted to the base station apparatus via the transmission/reception separator 1202 and antenna 1201.

Then, in the base station apparatus shown in FIG. 12, a transmission power controller 1106 controls dedicated channel signal transmission power in accordance with the transmission power control information transmitted from the communication terminal. That is to say, when the transmission power controller 1106 predicts that dedicated channel signal reception quality cannot be maintained at the predetermined desired quality due to the start of DSCH signal transmission, it increases the transmission power of a dedicated channel signal for a communication terminal located in the vicinity of a communication terminal to which the DSCH is assigned.

Thus, according to this embodiment, before DSCH signal transmission is started, notification of the fact that DSCH signal transmission is to be started is given to a communication terminal located in the vicinity of a communication terminal to which the DSCH is assigned, and the communication terminal notified of this requests the base station to increase transmission power according to the current dedicated channel signal reception quality, thereby enabling dedicated channel signal reception quality to be maintained at a predetermined desired quality in a communication terminal located in the vicinity of a communication terminal to which the DSCH is assigned even when DSCH signal transmission is started.

In this embodiment, information indicating the difference between the direction of arrival of a signal from the communication terminal to which the DSCH is assigned and the direction of arrival of a signal from a communication terminal that transmits transmission start notification information may also be included in the transmission start notification information. By this means, a communication terminal notified of transmission start notification information can perform transmission power control that takes this difference in direction of arrival into consideration, thereby enabling more accurate transmission power control to be performed. To be specific, when, for example, the difference in direction of arrival is less than a predetermined threshold value, a communication terminal notified of transmission start notification information will predict a major effect of increased interference due to the start of DSCH signal transmission, and will direct the base station to increase dedicated channel signal transmission power. And if the difference in direction of arrival is greater than or equal to a predetermined threshold value, a communication terminal notified of transmission start notification information will predict a minor effect of increased interference due to the start of DSCH signal transmission, and will direct the base station to maintain the dedicated channel signal transmission power.

(Embodiment 6)

In this embodiment, a case is described where a DSCH signal is transmitted with the same directivity to a plurality of communication terminals for which the received signal direction of arrival is within a predetermined range.

Figure 14:
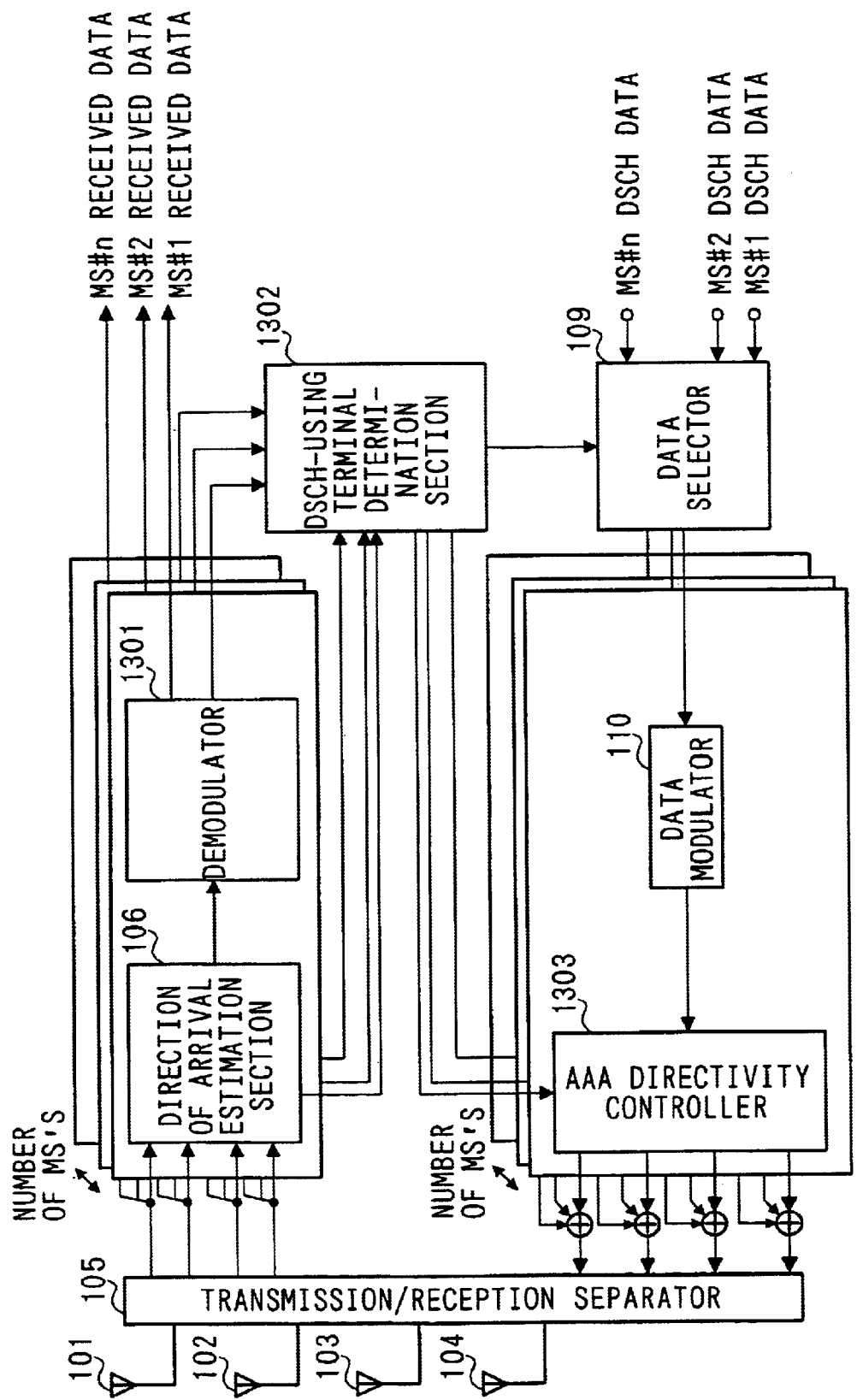
FIG. 14 is a main block diagram showing a schematic configuration of a base station apparatus according to Embodiment 6 of the present invention.

FIG. 14 is a main block diagram showing a schematic configuration of a base station apparatus according to Embodiment 6 of the present invention. Parts in FIG. 14 identical to those in Embodiment 1 are assigned the same codes as in Embodiment 1 and their detailed explanations are omitted.

In FIG. 14, a demodulator 1301 separates information (such as a communication terminal reception SIR, for example) indicating downlink channel quality sent from a communication terminal from a demodulated received signal, and sends this information to a DSCH-using terminal determination section 1302. In the DSCH-using terminal determination section 1302, the communication terminal that will use the DSCH is determined based on communication terminals that have transmitted a request signal indicating a wish to use the DSCH, and information indicating downlink channel quality. That is to say, the DSCH-using terminal determination section 1302 determines terminals to which the DSCH is to be assigned in order of downlink channel quality (high to low).

The DSCH-using terminal determination section 1302 also divides a plurality of communication terminals that have transmitted a request signal indicating a wish to use the DSCH into groups for each predetermined direction of arrival range, and controls weights by which a DSCH signal is to be multiplied by an AAA directivity controller 1303 so that a DSCH signal is transmitted with the same directivity to communication terminals belonging to the same group.

That is to say, the DSCH-using terminal determination section 1302 takes the communication terminal to which the DSCH is assigned as a representative terminal of a group, and takes communication terminals that transmit a signal that arrives from a direction within a predetermined range from the direction of arrival of a signal transmitted from that representative terminal as one group. Then, in order for a DSCH signal to be transmitted with the same directivity to all communication terminals belonging to the same group, the DSCH-using terminal determination section 1302 outputs information indicating the direction of arrival of a signal transmitted from the representative terminal of a group (that is, information indicating the direction of the representative terminal of a group from among direction of arrival information estimated by a direction of arrival estimation section 106) to an AAA directivity controller 1303 corresponding to communication terminals belonging to that group.

The AAA directivity controller 1303 forms a transmission directivity based on information indicating direction of arrival output from the DSCH-using terminal determination section 1302. That is to say, the AAA directivity controller 1303 multiplies all DSCH signals to communication terminals belonging to the same group by the same weight. DSCH signals multiplied by a weight are transmitted to the respective communication terminals from antennas 101 through 104 via a transmission/reception separator 105.

Figure 15:
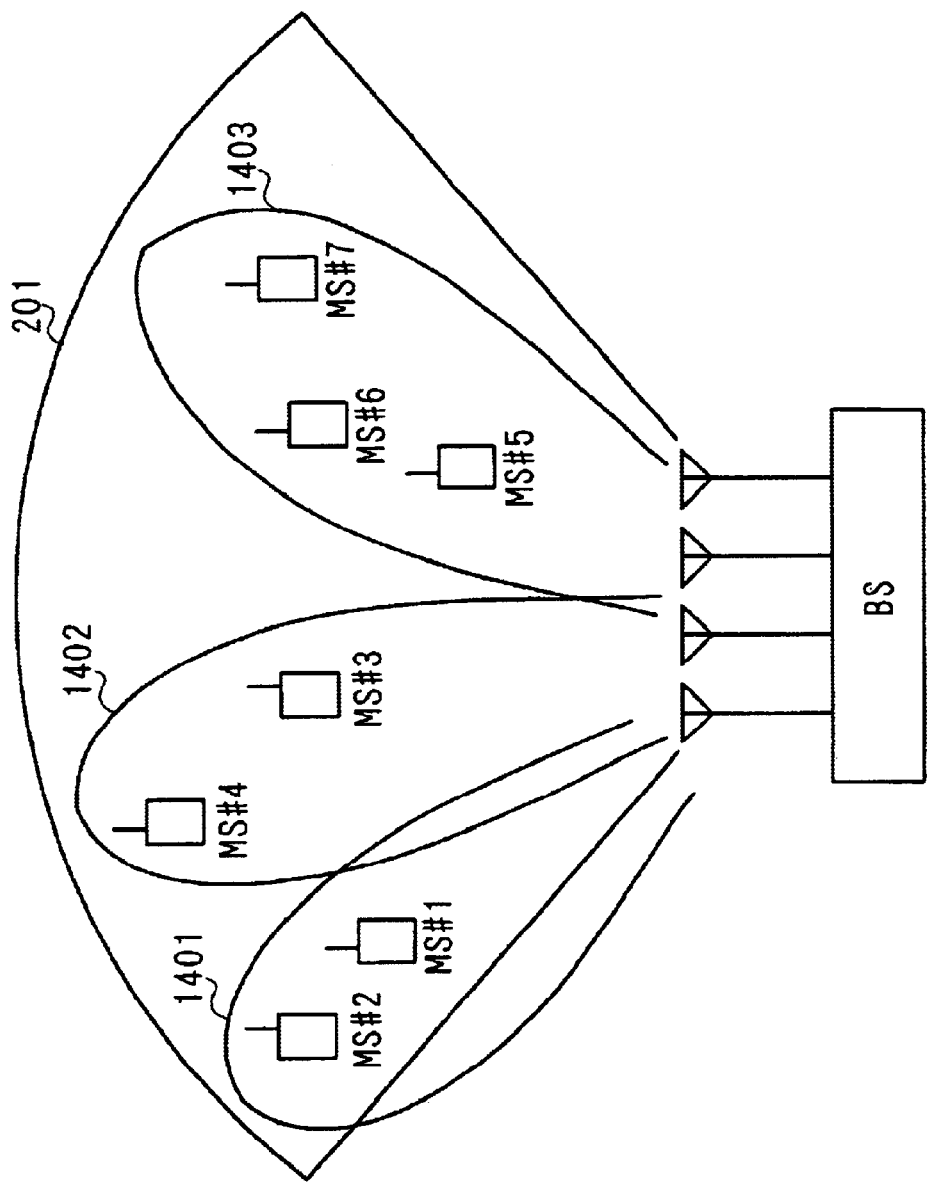
FIG. 15 is a drawing showing radiation patterns for explaining transmission directivity control performed by a base station apparatus according to Embodiment 6 of the present invention.

Next, DSCH signal transmission directivity control according to this embodiment will be described in detail. FIG. 15 is a drawing showing radiation patterns for explaining transmission directivity control performed by a base station apparatus according to Embodiment 6 of the present invention.

In FIG. 15, it is assumed that request signals indicating a wish to use the DSCH are transmitted by communication terminals #1 through #7. Reference code 201 indicates the nondirectional transmission area.

The DSCH-using terminal determination section 1302 first determines the DSCH assignment order according to downlink channel quality. Here, downlink channel quality is assumed to improve in order from communication terminal #1 through communication terminal #7. Thus, the DSCH assignment order determined by the DSCH-using terminal determination section 402 is communication terminal #1 through communication terminal #7.

Next, the DSCH-using terminal determination section 1302 takes communication terminal #1 to which the DSCH is first assigned as a group representative terminal, and, based on direction of arrival estimation results, detects terminals transmitting a signal that arrives from a direction within a predetermined range of angles with reference to the direction of arrival of a signal transmitted from communication terminal #1. Here, it is assumed that the only communication terminal transmitting a signal that arrives from a direction within the predetermined range of angles from the direction of arrival of a signal transmitted from communication terminal #1 is communication terminal #2.

The DSCH-using terminal determination section 1302 then outputs information indicating the direction of arrival of a signal transmitted from communication terminal #1 to both the AAA directivity controller 1303 for communication terminal #1 and the AAA directivity controller 1303 for communication terminal #2. By this means, the DSCH signal for communication terminal #1 and the DSCH signal for communication terminal #2 are multiplied by the same weight in accordance with the direction of arrival of the signal transmitted from communication terminal #1, and are transmitted after the same transmission directivity 1401 has been formed for them.

Next, the DSCH-using terminal determination section 1302 takes communication terminal #3 to which the DSCH is next assigned as a group representative terminal, and controls a weight for multiplication by the AAA directivity controller 111 in the same way as for communication terminal #1 and communication terminal #2. Thus, the DSCH signal for communication terminal #3 and the DSCH signal for communication terminal #4 are transmitted after the same transmission directivity 1402 has been formed for them.

Thereafter, similar operations are performed, and the DSCH signal for communication terminal #5, the DSCH signal for communication terminal #6, and the DSCH signal for communication terminal #7 are transmitted after the same transmission directivity 1403 has been formed for them.

The size of the predetermined range of angles with reference to a signal transmitted from a representative terminal is set taking the balance between the number of times transmission directivity is switched and the decrease in interference due to transmission directivity formation into consideration.

Thus, according to this embodiment, communication terminals to which the DSCH is to be assigned are divided into a number of groups, and a DSCH signal is transmitted with the same directivity formed to all communication terminals belonging to the same group, thereby enabling the number of times DSCH signal transmission directivity is switched to be reduced. By this means, the greater the number of communication terminals belonging to the same group, the greater is the reduction in the frequency with which interference power received from a DSCH signal changes suddenly in a communication terminal located in the vicinity of a communication terminal to which the DSCH is assigned, and the longer is the interval during which interference power is held constant. Thus, in a communication terminal located in the vicinity of a communication terminal to which the DSCH is assigned, it becomes possible for increases in dedicated channel signal transmission power to track changes in interference power by means of downlink transmission power control for a dedicated channel signal, and it is possible to reduce deterioration of reception quality due to interference received from a DSCH signal.

In above Embodiments 1 through 6, descriptions have been given taking the example of a radio communication system in which downlink high-speed data communication is performed using a DSCH, but this is not a limitation, and the present invention can also be applied to any radio communication system in which a base station performs downlink high-speed data communication by determining shared channel assignment in accordance with information transmitted from communication terminals.

As described above, according to the present invention it is possible to prevent a major deterioration of dedicated channel signal reception quality even when an adaptive array is used for shared channel signal transmission, thereby enabling good downlink communication conditions to be maintained.

This application is based on Japanese Patent Application No. 2000-197132 filed on Jun. 29, 2000, entire content of which is expressly incorporated by reference herein.

Industrial Applicability

The present invention is applicable to any radio communication system in which a base station performs downlink high-speed data communication by determining shared channel assignment in accordance with information transmitted from communication terminals.

What is claimed is:

1. A base station apparatus, which assigns a shared channel shared by a plurality of communication terminal apparatuses including a first communication terminal apparatus, the base station apparatus comprising:

an estimator that estimates a direction of arrival of a signal transmitted from each of the plurality of communication terminal apparatuses;

a determiner that determines, based on a difference between a direction of arrival of a signal from the first communication terminal apparatus and a direction of arrival of a signal from each communication terminal apparatus other than the first communication terminal apparatus of the plurality of communication terminal apparatuses, a communication terminal apparatus to which the shared channel is assigned after the first communication terminal apparatus, to determine an order of communication terminal apparatuses to which the shared channel is assigned; and a transmitter that forms a directivity in the estimated direction of arrival in accordance with the determined order, and transmits a shared channel signal to each of the plurality of communication terminal apparatuses.

2. The base station apparatus according to claim 1 wherein said determiner determines a communication terminal apparatus of a direction of arrival having a smallest difference from a direction of arrival of a signal transmitted from the first communication terminal apparatus, as a communication terminal apparatus to which the shared channel is assigned next after the first communication terminal apparatus.

3. A base station apparatus, which assigns a shared channel shared by a plurality of communication terminal apparatuses including a first communication terminal apparatus, the base station apparatus comprising:
  an estimator that estimates a direction of arrival of a signal transmitted from each of the plurality of communication terminal apparatuses;
  a determiner that determines, in accordance with a value calculated from a communication of a priority assigned in association with downlink channel quality and a value indicating the estimated direction of arrival, a communication terminal apparatus to which the shared channel is assigned after the first communication terminal apparatus, to determine an order of communication terminal apparatuses to which the shared channel is assigned; and
  a transmitter that forms a directivity in the estimated direction of arrival in accordance with the determined order, and transmits a shared channel signal to each of the plurality of communication terminal apparatuses.

4. A base station apparatus comprising:
  an estimator that estimates a direction of arrival of a signal transmitted from each of a plurality of communication terminal apparatuses;
  a determiner that determines an order of communication terminal apparatuses to which a shared channel is assigned, the shared channel is shared by the plurality of communication terminal apparatuses; and
  a transmitter that forms a directivity in a direction of arrival estimated for a signal transmitted from a first communication terminal apparatus of the plurality of communication terminal apparatuses, and transmits a dummy signal whose transmission power is increased gradually to a predetermined transmission power value, of a shared channel signal, prior to a start of transmission of the shared channel signal to the first communication terminal apparatus in accordance with the determined order.

5. A base station apparatus comprising:
  an estimator that estimates a direction of arrival of a signal transmitted from each of a plurality of communication terminal apparatuses;
  a determiner that determines an order of communication terminal apparatuses to which a shared channel is assigned, the shared channel is shared by the plurality of communication terminal apparatuses;
  a transmitter that forms a directivity in a direction of arrival estimated for a signal transmitted from a first communication terminal apparatus of the plurality of communication terminal apparatuses, and transmits a shared channel signal to the first communication terminal apparatus; and
  a transmission power controller that increases a transmission power of a dedicated channel signal to be transmitted to a second communication terminal apparatus that exists in the vicinity of the first communication terminal apparatus.

6. The base station apparatus according to claim 5, wherein said transmission power controller increases the transmission power of the dedicated channel signal during transmission of the shared channel signal.

7. The base station apparatus according to claim 5, further comprising:
  a notifier that notifies, prior to a start of transmission of the shared channel signal to the communication terminal apparatuses, the second communication terminal apparatus of the start, wherein:
    said transmission power controller increases the transmission power of the dedicated channel signal in accordance with a request from the second communication terminal apparatus.

8. A communication terminal apparatus, which performs radio communication with a base station apparatus that assigns a shared channel to a plurality of communication terminal apparatuses, the shared channel being shared by the plurality of communication terminal apparatuses, the communication terminal apparatus comprising:
  a detector that detects a notification of a start of transmission of the shared channel to one of the plurality of communication terminal apparatuses, the notification being performed by the base station apparatus; and
  a transmitter that determines whether or not a reception quality of a dedicated channel signal deteriorates beyond a predetermined level due to the start of transmission of the shared channel signal, and transmits, when determining the reception quality deteriorates beyond the predetermined level, a signal requesting that a transmission power of the dedicated channel signal be increased.

9. A radio communication method in a base station apparatus, which assigns a shared channel shared by a plurality of communication terminal apparatuses including a first communication terminal apparatus, the method comprising:
  estimating a direction of arrival of a signal transmitted from each of the plurality communication terminal apparatuses;
  determining, based on a difference between a direction of arrival of a signal from the first communication terminal apparatus and a direction of arrival of a signal from each communication terminal apparatus other than the first communication terminal apparatus of the plurality of communication terminal apparatuses, a communication terminal apparatus to which the shared channel is assigned after the first communication terminal apparatus, to determine an order of communication terminal apparatuses to which the shared channel is assigned;
  forming a directivity in the estimated direction of arrival in accordance with the determined order; and
  transmitting a shared channel signal to each of the plurality of communication terminal apparatuses.

10. The radio communication method according to claim 9, wherein a communication terminal apparatus of a direction of arrival having a smallest difference from a direction of arrival of a signal transmitted from the first communication terminal apparatus is determined as the communication terminal apparatus to which the shared channel is assigned next after the first communication terminal apparatus.

11. A radio communication apparatus, which assigns a shared channel shared by a plurality of communication terminal apparatuses including a first communication terminal apparatus, the method comprising:
  estimating a direction of arrival of a signal transmitted from each of the plurality of communication terminal apparatuses;
  determining, in accordance with a value calculated from a combination of a priority assigned in association with downlink channel quality and a value indicating the estimated direction of arrival, a communication terminal apparatus to which the shared channel is assigned after the first communication terminal apparatus, to determine an order of communication terminal apparatuses to which the shared channel is assigned;

forming a directivity in the estimated direction of arrival in accordance with the determined order; and transmitting a shared channel signal to each of the plurality of communication terminal apparatuses.

12. A radio communication method comprising:

estimating a direction of arrival of a signal transmitted from each of a plurality of communication terminal apparatuses;

determining an order of communication terminal apparatuses to which a shared channel is assigned, the shared channel is shared by the plurality of communication terminal apparatuses;

forming a directivity in a direction of arrival estimated for a signal transmitted from a first communication terminal apparatus of the plurality of communication terminal apparatuses; and transmitting a dummy signal whose transmission power is increased gradually to a predetermined transmission power value of a shared channel signal, prior to a start of transmission of the shared channel signal to the first communication terminal apparatus in accordance with the determined order.

13. A radio communication method comprising:

estimating a direction of arrival of a signal transmitted from each of a plurality of communication terminal apparatuses;

determining an order of communication terminal apparatuses to which a shared channel is assigned, the shared channel is shared by the plurality of communication terminal apparatuses;

forming a directivity in a direction of arrival estimated for a signal transmitted from a first communication terminal apparatus of the plurality of communication terminal apparatuses;

transmitting a shared channel signal to the first communication terminal apparatus; and increasing a transmission power of a dedicated channel signal to be transmitted to a second communication terminal apparatus that exists in the vicinity of the first communication terminal apparatus.

14. The radio communication method according to claim 13, wherein the transmission power of the dedicated channel signal is increased during transmission of the shared channel signal.

15. The radio communication method according to claim 13, further comprising:

notifying, prior to a start of transmission of the shared channel signal to the first communication terminal apparatus, the second communication terminal apparatus of the start, wherein:

the transmission power of the dedicated channel signal is increased in accordance with a request from the second communication terminal apparatus.

16. A radio communication method in a communication terminal apparatus, which performs radio communication with a base station apparatus that assigns a shared channel to a plurality of communication terminal apparatuses, the shared channel being shared by the plurality of communication terminal apparatuses, the method comprising:

detecting a notification of a start of transmission of the shared channel to one of the plurality of communication terminal apparatuses, the notification being performed by the base station apparatus;

determining whether or not a reception quality of a dedicated channel signal deteriorates beyond a predetermined level due to the start of transmission of the shared channel signal; and transmitting, when determining the reception quality deteriorates beyond the predetermined level, a signal requesting that a transmission power of the dedicated channel signal be increased.

* * * * *